United States Patent
Lev et al.

(10) Patent No.: US 6,846,261 B2
(45) Date of Patent: Jan. 25, 2005

(54) PLANETARY GEARSET WITH MULTI-LAYER COATED SUN GEAR

(75) Inventors: Leonid Charles Lev, West Bloomfield, MI (US); Yang-Tse Cheng, Rochester Hills, MI (US); Neil E Anderson, Novi, MI (US); Anita Miriam Weiner, West Bloomfield, MI (US); Robert F. Paluch, Allenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/237,140

(22) Filed: Sep. 6, 2002

(65) Prior Publication Data

US 2004/0048711 A1 Mar. 11, 2004

(51) Int. Cl.[7] ............................. B21D 53/28; B21K 1/30; B23P 15/14; F16H 57/04; F16H 57/08
(52) U.S. Cl. ..................... 475/159; 475/344; 475/901; 29/893.1
(58) Field of Search .................... 475/344–345, 475/159, 901; 74/457, 468; 29/893.1, 893.3

(56) References Cited

U.S. PATENT DOCUMENTS

| | | | |
|---|---|---|---|
| 4,717,632 A | * | 1/1988 | Keem et al. ............. 428/698 |
| 4,921,025 A | | 5/1990 | Tipton et al. ............ 148/16.5 |
| 4,943,486 A | | 7/1990 | Uchiyama ................ 428/469 |
| 4,944,196 A | * | 7/1990 | Rivin ........................ 74/443 |
| 5,288,556 A | * | 2/1994 | Lemelson ................ 428/408 |
| 5,549,764 A | | 8/1996 | Biltgen et al. ........... 148/222 |
| 5,616,862 A | | 4/1997 | Pucher ...................... 73/261 |
| 5,718,568 A | | 2/1998 | Neftel et al. ............. 417/476 |
| 5,743,536 A | | 4/1998 | Komuro et al. .......... 277/235 |
| 5,783,295 A | | 7/1998 | Barnett et al. ........... 428/216 |
| 5,851,659 A | | 12/1998 | Komuro et al. .......... 428/336 |
| 6,093,131 A | | 7/2000 | Rohs ......................... 476/53 |
| 6,170,156 B1 | * | 1/2001 | Lev et al. ................. 29/893.1 |
| 6,206,667 B1 | | 3/2001 | Turner et al. ............ 418/178 |
| 6,408,284 B1 | | 6/2002 | Hilt et al. .................. 705/40 |
| 6,629,080 B1 | | 9/2003 | Kolls ......................... 705/26 |

FOREIGN PATENT DOCUMENTS

| | | | | |
|---|---|---|---|---|
| JP | 60101353 A | * | 6/1985 | ........... F16H/13/08 |
| JP | 03014998 A | * | 1/1991 | ........... F16N/39/04 |

* cited by examiner

*Primary Examiner*—Tisha Lewis
(74) *Attorney, Agent, or Firm*—Kathryn A. Marra

(57) ABSTRACT

A planetary gearset includes a sun gear member having a sun gear body made of a steel material and an outer periphery with a plurality of teeth formed thereon. Each of the sun gear teeth has at least one mating surface for engaging mating surfaces on complementary teeth on at least one planet gear. A fatigue-resistant coating is applied to the mating surfaces of the sun gear teeth. The coating is harder and more abrasive than the mating surfaces of the planet gear teeth.

10 Claims, 2 Drawing Sheets

PLANETARY GEARSET WITH MULTI-LAYER COATED SUN GEAR

BACKGROUND OF THE INVENTION

The present invention relates generally to gears and planetary gearsets and, in particular, to a planetary gearset with a multi-layer coated sun gear.

Gears, which are utilized to transmit torque from one rotating shaft to another for driving rotating equipment by utilizing engaging gear teeth, are well known. A plurality of interconnected gears is known in the art as a gearset. A typical planetary gearset includes a sun gear member, a plurality of planet gear members supported by a carrier member, and a ring gear member.

In automotive planetary gearsets, the sun gear member is usually connected to and rotated by a drive shaft. The outer periphery of the sun gear member includes a plurality of gear teeth formed thereon. Each of the sun gear teeth includes mating surfaces that engage with corresponding mating surfaces on respective gear teeth of a plurality of planet gears. The gear teeth on the planet gears also engage with gear teeth on the inner surface of a ring gear.

During the operation of automotive planetary gearsets, the sun gear is engaged with the planet gears and transmits high levels of torque. As a result, the sun gear teeth are exposed to heavy periodic loads. The number of times the load is applied to each sun gear tooth during a single revolution of the sun gear is proportional to the number of planet gears in the planetary gearset. This repeated loading often results in fatigue of the mating surfaces of the sun gear teeth.

In a typical automotive transmission utilizing a planetary gearset, the sun gear is not rigidly mounted on the drive shaft, but is connected via a set of internal splines that engage with a corresponding set of external splines on the drive shaft. The splines allow the sun gear to "float" i.e., to make small random movements, in a radial direction and still fully transmit the torque. These radial movements help to re-distribute the torque evenly among the planet gears, increasing the torque capacity of the gearset overall. Because of this floating connection, the sun and planet gears occasionally experience dynamic loads in addition to the transmitted torque load.

A typical process used for manufacturing automotive gears includes hobbing and shaving, followed by a thermo-chemical treatment, such as carburization. As a result of these manufacturing processes, the mating surfaces of the gear teeth are covered with asperities or small projections extending upward therefrom. Typically, the as-machined surface roughness of the sun and planet gears reach the micron level, with the Ra parameter normally being between 0.20 to 0.50 microns. During gearset operation, high stresses may develop at the tips of the asperities.

Also, the shape and dimensions of the gears overall and the shape and dimensions of the mating surfaces of the gear teeth may deviate from the desired and prescribed shape by up to 20 microns as a result of small machining errors. This may lead to areas of high contact stress.

To improve tribological conditions during operation of the gearset, the mating surfaces of the gear teeth are supplied with lubricating oil. Due to hydrodynamic effects, a thin oil film usually forms between moving parts, such as mating surfaces of gear teeth. When the surface asperity heights are equal to or greater than the oil film thickness, the oil film is punctured and metal-to-metal contact occurs. This is known in the art as boundary lubrication. Boundary lubrication may result in localized micro-welding, an increase in surface shear stress, and surface fatigue. This is often observed in uncoated gears during the run-in or break-in period. When the surface asperity heights become smaller than the hydrodynamic oil film, metal-to-metal contact ceases, the coefficient of friction drops and the fatigue processes are either arrested altogether or significantly slowed. This type of lubrication is known in the art as elasto-hydrodynamic (EHD) lubrication.

Furthermore, in a planetary gearset, the planet gears are supported by a planet carrier, which affects the interaction of the planet gears with the sun and the ring gears. Due to manufacturing errors and non-compensated elastic deflections of all the interconnected parts, including the sun gear, the planet gears, the ring gear, the carrier, and the shafts, misalignment of mating surfaces is inevitable, resulting in high contact stresses on the mating surfaces. The local stress between mating surfaces of two misaligned gears may reach the level of the gear hardness, which is typically in the range of 8 GPa. This stress can result in an undue fatigue of the planetary gearset, premature failure of the gears and damage to the driven or driving equipment.

It is desirable, therefore, to reduce the level of stress acting on the mating surfaces of the gear teeth of a planetary gearset. It is also desirable to provide a planetary gearset with a sun gear that will extend the life of the planetary gearset and associated driven equipment. It is also desirable to decrease the height of the asperities. Since the oil film thickness remains unchanged, this will change the lubrication regime from boundary lubrication to full-film EHD lubrication. In addition, it is desirable to produce gearsets with reduced manufacturing errors and lower deviation from the desired shape.

SUMMARY OF THE INVENTION

The present invention includes a sun gear member for use in a planetary gearset. The sun gear member includes a sun gear body formed of a steel material and having an outer periphery with a plurality of teeth formed thereon. Preferably, the sun gear body is formed from a low carbon steel that is carburized and heat-treated. Each sun gear tooth has at least one mating surface for engaging mating surfaces on complementary teeth on at least one planet gear. Preferably, the sun gear engages mating surfaces on complementary teeth on a plurality of planet gears. The teeth on each of the planet gears engage with a ring gear, which has a plurality of teeth formed on the inner periphery thereof. The ring gear, the sun gear, the carrier and the plurality of planet gears together form a planetary gearset. A fatigue-resistant coating is applied to the mating surfaces of the sun gear teeth. The coating is harder and more abrasive than the complementary mating surfaces of the planet gear teeth.

The fatigue-resistant coating on the sun gear preferably consists of multiple layers. The outermost layer of the coating is preferably ceramic and may consist of carbides, borides and nitrides of transitional metals. Other combinations for the outermost layer can be chromium nitride (CrN), titanium nitride (TiN), zirconium nitride (ZrN), titanium chromate (TiC), aluminum nitrate (AlN), aluminum chromate (AlC) and other ceramics. The innermost layer is preferably metallic, and may consist of titanium (Ti), chromium (Cr), zirconium (Zr), and silicon (Si). Other materials for the innermost layer can be cobalt (Co), nickel (Ni), vanadium (V) and other metals. Any of these layers can be deposited on the mating surfaces by, for example, unbalanced magnetron sputtering. The thickness of the innermost layer is preferably in the range of between 0.1 to 3 microns and the thickness of the outermost layer is preferably in the range of between 1 to 10 microns.

Alternatively, at least one intermediate layer is interposed between the outermost layer and the innermost layer. In the case when the coating includes more than two layers, the outermost layer is selected to have high resistance to wear, fatigue and plastic deformation and usually is ceramic. The innermost layer is selected to approximate smooth, gradual and continuous change in susceptibility and resistance to plastic deformation between the substrate material and the outer layers of the coating and is usually metallic. The intermediate layer or layers are selected to approximate a smooth, continuous and gradual change in resistance and susceptibility to plastic deformation between the inner layer and the outermost layer of coating and can consist of metals and ceramics and mixtures thereof. The thickness of the intermediate layer is preferably in the range of between 1 to 5 microns.

The hard, ceramic, outermost coating layer protects the mating surfaces of the sun gear from surface fatigue and helps in forming improved lubrication conditions by smoothing the mating surfaces of the planet gears via wear and by developing a very smooth surface on the sun gear. Also, the ceramic coating stops formation of surface-initiated fatigue cracks on the sun gear and removes cracks that might initiate on the planet gear.

The metallic innermost layer is applied beneath the ceramic coating on the sun gear to allow absorption of the energy due to dynamic loads. The stress developed between the complementary mating surfaces of non-coated sun and planet gears is high and sometimes leads to plastic deformation of the mating surfaces of the sun gear teeth. The ceramic coating, however, does not deform plastically under normal operating conditions and it might fracture or crack if installed without a tough layer underneath. The tough, innermost, metallic layer underneath the outermost, ceramic coating protects the ceramic coating from this type of fracture.

In operation, when the coated sun gear is meshed or brought into engagement with a plurality of uncoated planet gears, the hard, sharp tips of the CrN grains polish the mating surfaces on the teeth of the planet gears. The original, relatively rough mating surface of planet gears, with its characteristic pattern of shaving marks, is removed and a new, extremely fine roughness pattern is developed. The CrN-coated surface wears as well, albeit to a smaller degree, producing a very smooth bearing surface. The planet gears wear unevenly. The wear is typically localized to the tips of asperities, because the areas of the planet gears that are exposed to a higher stress, such as the tips of asperities, wear more intensely than the areas exposed to a lower stress. This wear lowers the height of the asperities, which changes the lubrication regime from boundary lubrication to full-film EHD lubrication. Also, this wear corrects the deviations from the desired gear shape such that it leads to uniform re-distribution of the stress along the entire mating surface of the gear tooth.

Selective local wear of the planet gears due to the presence of the abrasive coating results in a more uniform distribution of the stress. As a result of the described localized surface wear, the stress on the mating surfaces drops to the design level of 2 GPa or less.

The transition between boundary lubrication and full-film EHD lubrication conditions occurs during the run-in of the coated gears, due to polishing and localized wear. Thus, the described improvement in the surface roughness, derived by coating-induced wear, eliminates the metal-to-metal contact between uncoated gears and changes the lubrication regime, from boundary lubrication to full-film, EHD lubrication, increasing the life of the sun gear and the planetary gearset as a whole.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
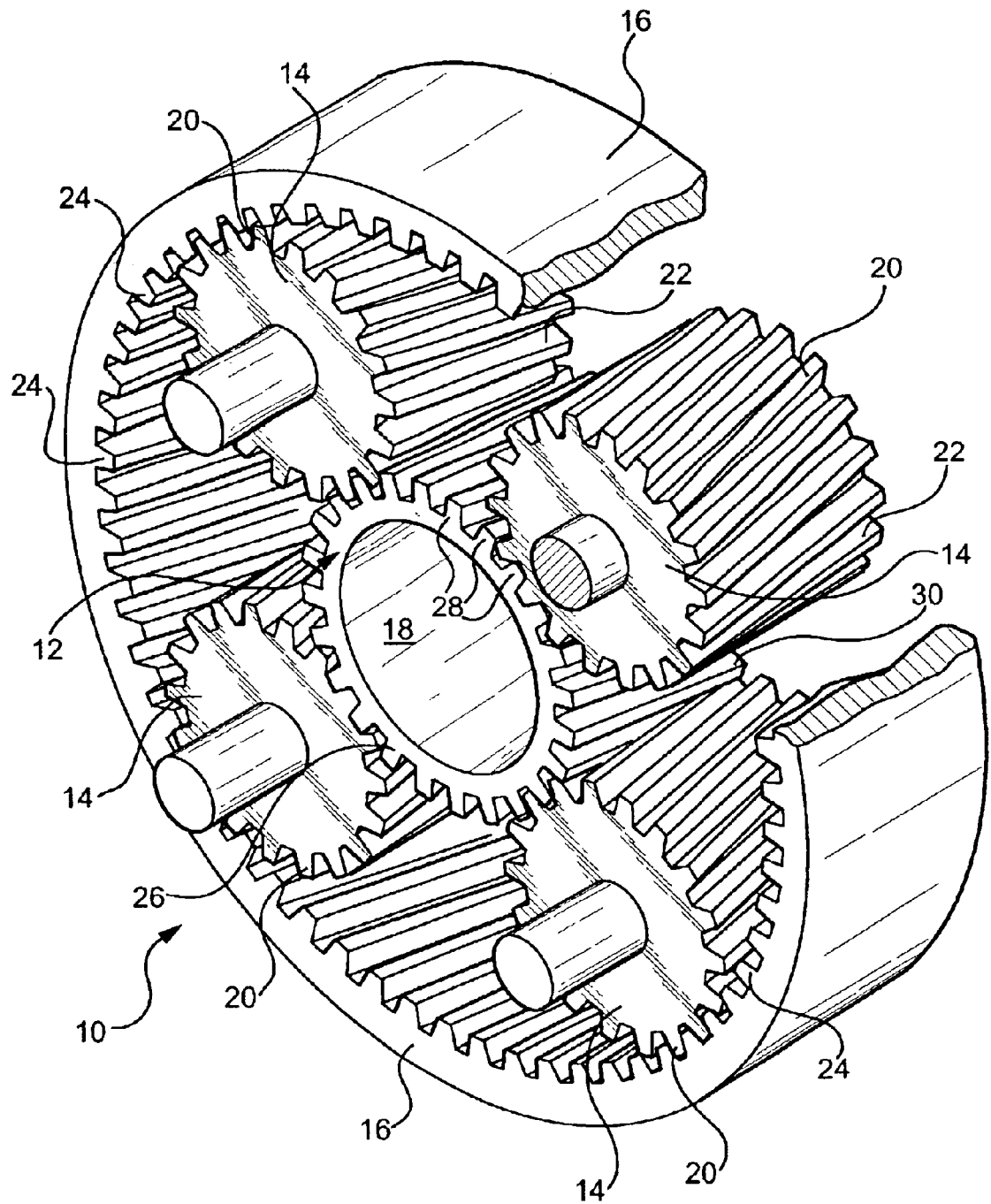
FIG. 1 is a perspective view of a planetary gearset in accordance with the present invention.

Referring now to FIG. 1, a planetary gearset is indicated generally at 10. The gearset 10 includes a sun gear member 12, a plurality of planet gear members 14, and a ring gear member 16. The sun gear member 12, the planet gear members 14 and the ring gear member 16 are preferably made of a steel material. The sun gear member 12 has a central opening 18 for attachment to a drive shaft (not shown), such as a drive shaft from an automotive automatic transmission (not shown). Each of the planet gears 14 is attached to an associated shaft 19 via bearings (not shown) extending from an axis of rotation thereof and has a plurality of teeth 20 formed on an outer periphery thereof. Each of the teeth 20 of the planet gears 14 includes a mating surface 22 that engages with a corresponding mating surface (not shown) on a plurality of teeth 24 on an inner surface of the ring gear 16.

The sun gear member 12 includes a sun gear body 26 having an outer periphery with a plurality of gear teeth 28 formed thereon. The sun gear body 26 is preferably made from a low carbon steel that is carburized and heat treated. Each of the sun gear teeth 28 has at least one mating surface 30 for engaging the mating surfaces 22 on the complementary teeth 20 on the planet gears 14. Each of the mating surfaces 30 and 22 includes asperities (not shown) extending upward therefrom.

Figure 2:
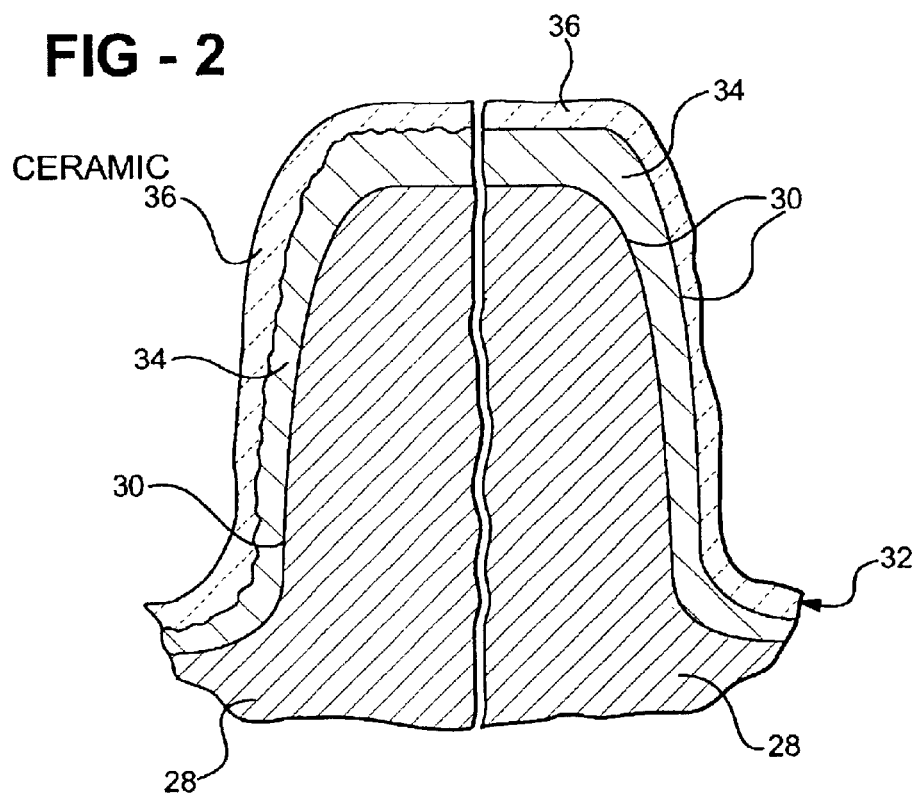
FIG. 2 is a cross-sectional view of a coated gear tooth in accordance with the present invention.

Referring now to FIG. 2, a sun gear tooth 28 is shown in cross-section. The sun gear tooth 28 includes a fatigue-resistant coating 32 applied to the mating surface 30 of the gear tooth 28. The coating 32 is harder and more abrasive than the complementary mating surfaces 22 of the planet gear teeth 20. The coating 32 includes a first or inner layer 34 applied to the mating surface 30 and a second or outer layer 36 disposed on the first layer 34. The first layer 34 of the coating 32 is preferably metallic and is composed of titanium (Ti), chromium (Cr), zirconium (Zr), or silicon (Si). Alternatively, the first layer 34 of the coating 32 is composed of cobalt (Co), nickel (Ni), or vanadium (V). The thickness of the first layer 34 of the coating 32 is preferably in the range of between 0.1 to 3 microns.

The second layer 36 of the coating 32 is preferably ceramic and may be composed of carbides, borides and nitrides of transitional metals. Alternatively, the second layer 36 of the coating 32 is composed of chromium nitride (CrN), titanium nitride (TiN), zirconium nitride (ZrN), titanium chromate (TiC), aluminum nitrate (AlN), aluminum chromate (AlC) or other ceramics. The thickness of the second layer 36 of the coating 32 is preferably in the range of between 1 to 10 microns.

Figure 3:
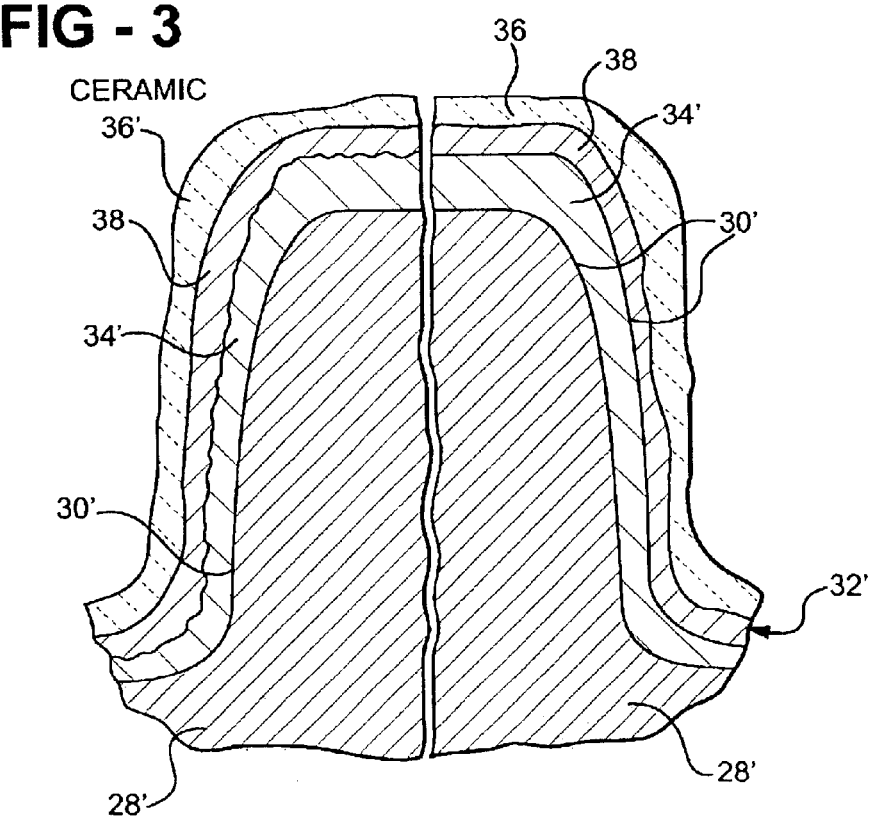
FIG. 3 is a cross-sectional view of an alternative embodiment of a coated gear tooth in accordance with the present invention.

Referring now to FIG. 3, an alternative embodiment of a sun gear tooth 28' is shown in cross-section. The sun gear tooth 28' includes a fatigue-resistant coating 32' applied to the mating surfaces 30' of the gear tooth 28'. The coating 32' is harder and more abrasive than the complementary mating surfaces 22 of the planet gear teeth 20. The coating 32' includes a first or innermost layer 34' adjacent the mating surface 30', an intermediate layer 38 disposed on the first layer 34', and a second or outermost layer 36' disposed on the intermediate layer 38. The first layer 34' of the coating 32' is preferably metallic and is composed of titanium (Ti), chromium (Cr), zirconium (Zr), or silicon (Si). Alternately, the first layer 34' is composed of cobalt (Co), nickel (Ni), or vanadium (V). The thickness of the first layer 34' of the coating 32' is preferably in the range of between 0.1 to 3 microns.

The second layer 36' of the coating 32' is preferably ceramic and is composed of carbides, borides and nitrides of transitional metals. Alternately, the second layer 36' is composed of chromium nitride (CrN), titanium nitride (TiN), zirconium nitride (ZrN), titanium chromate (TiC), aluminum nitrate (AlN), aluminum chromate (AlC) or other ceramics. The thickness of the second layer 36' of the coating 32' is preferably in the range of between 1 to 10 microns.

The intermediate layer 38 of the coating 32' is preferably composed of metals and ceramics and mixtures thereof. The thickness of the intermediate layer 38 of the coating 32' is preferably in the range of 1 to 5 microns.

In operation, when the coated sun gear 28 or 28' is meshed or brought into engagement with the uncoated planet gears 14, the hard, sharp tips of the grains of the outer layer 36 or 36' polish the mating surfaces 22 of the teeth 20 of the planet gears 14. The original, relatively rough mating surfaces 22 of the teeth 20 of the planet gears 14, caused by the hobbing and shaving manufacturing process, is polished and a new extremely fine roughness pattern. The surface of the outer layer 36 or 36' wears as well, albeit to a smaller degree, producing a very smooth bearing surface. The wear is typically localized to the tips of asperities. Selective local wear of the planet gears 14 due to the presence of the abrasive coating 32 or 32' results in a more uniform distribution of the stress. As a result of the described localized surface wear, the stress on the mating surfaces 22 and 30 drops to the design level.

In accordance with the provisions of the patent statutes, the present invention has been described in what is considered to represent its preferred embodiment. However, it should be noted that the invention could be practiced otherwise than as specifically illustrated and described without departing from its spirit or scope.

What is claimed is:

1. A sun gear member for prolonged, low friction operational use in a planetary gearset in combination with at least one planet gear adapted for prolonged operational use within said planetary gearset, the sun gear member comprising:

a sun gear body made of a steel material and having an outer periphery with a plurality of teeth formed thereon, each said sun gear tooth having at least one mating surface for engaging mating surfaces on complementary teeth on said at least one planet gear; and a fatigue-resistant coating applied to said mating surfaces of said sun gear teeth, said coating being harder and more abrasive than the mating surfaces of the planet gear teeth, wherein said coating is formed of a first layer applied to said mating surfaces of each said sun gear tooth and a second layer disposed on said first layer, wherein said second layer is adapted to contact the mating surfaces of the planet gear teeth and wherein said first layer is a metallic material and said second layer is a ceramic material, wherein the coating comprises a plurality of outwardly projecting abrasive tips contacting the mating surfaces of the planet gear teeth prior to an initial run-in period and wherein following the initial run-in period, the sun gear teeth and the planet gear teeth operate with lubricating oil therebetween in a substantially full-film, elasto-hydrodynamic lubrication regime for an extended life cycle of the planetary gearset.

2. The sun gear member according to claim 1 wherein said metallic material is selected from a group consisting of titanium (Ti), chromium (Cr), zirconium (Zr), silicon (Si), cobalt (Co), nickel (Ni), and vanadium (V).

3. The sun gear member according to claim 1 wherein a thickness of said metallic material is in a range of 0.1 to 3 microns.

4. The sun gear member according to claim 1 wherein said ceramic material is selected from a group consisting of carbides, borides and nitrides of transitional metals, chromium nitride (CrN), titanium nitride (TiN), zirconium nitride (ZrN), titanium chromate (TiC), aluminum nitrate (AlN), and aluminum chromate (AlC) and other ceramics.

5. The sun gear member according to claim 1 wherein a thickness of said ceramic material is in a range of 1 to 10 microns.

6. The sun gear member according to claim 1 including an intermediate layer interposed between said first layer and said second layer.

7. The sun member according to claim 6 wherein said intermediate layer is one of a metal material, a ceramic material and a metal/ceramic mixture material.

8. The sun gear member according to claim 6 wherein the thickness of said intermediate layer is preferably in the range of 1 to 5 microns.

9. A planetary gearset comprising:

a sun gear for prolonged, low friction operational use in the planetary gearset, said sun gear having a sun gear body formed of a steel material and having an outer periphery with a plurality of teeth formed thereon, each said sun gear tooth having at least one mating surface;

a ring gear having a plurality of gear teeth formed on an inner periphery thereof;

a plurality of planet gears for prolonged, low friction operational use in the planetary gearset in combination with the sun gear, each of said planet gears having a plurality of gear teeth formed on an outer periphery thereof, said gear teeth on said planet gears engaging said sun gear teeth and said ring gear teeth; and a coating applied to said mating surfaces of said sun gear teeth, said coating including a first layer applied to said mating surface of each said sun gear tooth and a second layer disposed on said first layer, wherein said first layer is a metallic material and said second layer is a ceramic material, wherein the coating comprises a plurality of outwardly projecting abrasive tips contacting the mating surfaces of the planet gear teeth prior to an initial run-in period and wherein following the initial run-in period, the sun gear teeth and the gear teeth on the planet gears operate with lubricating oil therebetween in a substantially full-film, elasto-hydrodynamic lubrication regime for an extended life cycle of the planetary gearset.

10. A planetary gearset comprising:

a sun gear for prolonged, low friction operational use in the planetary gearset, said sun gear having a sun gear body formed of a steel material and having an outer periphery with a plurality of teeth formed thereon, each said sun gear toot having at least one mating surface;

a ring gear having a plurality of gear teeth formed on an inert periphery thereof;

a plurality of planet gears for prolonged, low friction operational use in the planetary gearset in combination with the sun gear, each of said planetary gears having a plurality of gear teeth formed on an outer periphery thereof, said gear teeth on said planet gears engaging said sun gear teeth and said ring gear teeth; and a coating applied to said mating surfaces of said sun gear teeth, said coating being harder and more abrasive than the mating surfaces of the planet gear teeth, said coating including a first layer applied to said mating surface of each said sun gear tooth, an intermediate layer disposed on said first layer and a second layer disposed on said intermediate layer, wherein said second layer is adapted to contact the mating surfaces of the planet gear teeth and wherein said first layer is a metallic material, said second layer is a ceramic material, and said intermediate layer is one of a metal material, a ceramic material and a metal/ceramic mixture material wherein the coating comprises a plurality of outwardly projecting abrasive tips contacting the mating surfaces of the planet gear teeth prior to an initial run-in period and wherein following the initial run-in period the sun gear teeth and the gear teeth on the planet gears operate with lubricating oil therebetween in a substantially full-film, elasto-hydrodynamic lubrication regime for an extended life cycle of the planetary gearset.

* * * * *